United States Patent
Kwon et al.

(10) Patent No.: US 10,863,321 B2
(45) Date of Patent: Dec. 8, 2020

(54) METHOD AND DEVICE FOR TRANSMITTING AND RECEIVING DATA USING BLUETOOTH TECHNOLOGY

(71) Applicant: LG ELECTRONICS INC., Seoul (KR)

(72) Inventors: Younghwan Kwon, Seoul (KR); Jangwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/343,929

(22) PCT Filed: Oct. 20, 2017

(86) PCT No.: PCT/KR2017/011675
§ 371 (c)(1),
(2) Date: Apr. 22, 2019

(87) PCT Pub. No.: WO2018/074892
PCT Pub. Date: Apr. 26, 2018

(65) Prior Publication Data
US 2019/0349718 A1  Nov. 14, 2019

Related U.S. Application Data

(60) Provisional application No. 62/410,859, filed on Oct. 21, 2016.

(51) Int. Cl.
*H04W 4/08* (2009.01)
*H04W 76/15* (2018.01)
(Continued)

(52) U.S. Cl.
CPC .............. *H04W 4/08* (2013.01); *H04W 4/80* (2018.02); *H04W 12/0401* (2019.01);
(Continued)

(58) Field of Classification Search
CPC ....... H04W 4/08; H04W 76/15; H04W 76/14; H04W 4/80; H04W 12/04;
(Continued)

(56) References Cited

U.S. PATENT DOCUMENTS 9,338,638 B1    5/2016  Palin et al.
10,321,516 B2 *  6/2019  Ohhira ................. H04W 88/06
(Continued)

FOREIGN PATENT DOCUMENTS

KR   10-2010-0134975 A   12/2010
KR   10-2015-0014215 A    2/2015
(Continued)

*Primary Examiner* — Lewis G West
(74) *Attorney, Agent, or Firm* — Birch, Stewart, Kolasch & Birch, LLP

(57) ABSTRACT

The present invention relates to a method and device for transmitting and receiving, by a first device, data using Bluetooth. The present invention provides a method and device wherein the first device: generates a group for group communication with a plurality of devices; exchanges, with the plurality of devices, first configuration information of the group for the group communication; establishes Bluetooth connection to the plurality of devices on the basis of the first configuration information, the Bluetooth connection being established using a broadcasting channel or a time division technique for establishing simultaneous connection to the plurality of devices; and transmits and receives voice data to and from the plurality of devices by using a specific channel.

16 Claims, 22 Drawing Sheets

(51) Int. Cl.
*H04W 76/14* (2018.01)
*H04W 4/80* (2018.01)
*H04W 12/04* (2009.01)

(52) U.S. Cl.
CPC ............... *H04W 12/04031* (2019.01); *H04W 12/04033* (2019.01); *H04W 12/04071* (2019.01); *H04W 76/14* (2018.02); *H04W 76/15* (2018.02)

(58) Field of Classification Search
CPC ....... H04W 12/04071; H04W 12/0401; H04W 12/04031; H04W 12/04033; H04W 4/00; H04W 84/20
See application file for complete search history.

(56) References Cited

U.S. PATENT DOCUMENTS

| | | | |
|---|---|---|---|
| 2015/0109897 A1* | 4/2015 | Lee | H04W 4/80 370/216 |
| 2015/0334245 A1* | 11/2015 | Lin | H04W 12/06 370/261 |
| 2018/0172664 A1* | 6/2018 | Love | A61B 5/14532 |

FOREIGN PATENT DOCUMENTS

| | | |
|---|---|---|
| WO | WO 2015/069030 A1 | 5/2015 |
| WO | WO 2015/194854 A1 | 12/2015 |

\* cited by examiner

FIG. 11

| AD type | AD Length | Group ID |
|---------|-----------|----------|

METHOD AND DEVICE FOR TRANSMITTING AND RECEIVING DATA USING BLUETOOTH TECHNOLOGY

CROSS REFERENCE TO RELATED APPLICATIONS

This application is the National Phase of PCT International Application No. PCT/KR2017/011675, filed on Oct. 20, 2017, which claims priority under 35 U.S.C. 119(e) to U.S. Provisional Application No. 62/410,859, filed on Oct. 21, 2016, all of which are hereby expressly incorporated by reference into the present application.

TECHNICAL FIELD

The present invention relates to a method and device for transmitting and receiving data using Bluetooth, that is, a short distance technology, in a wireless communication system and, more particularly, to a method and device for transmitting and receiving voice data between groups using the Bluetooth technology.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

The present invention provides a method and device for transmitting and receiving voice data using the Bluetooth technology.

Furthermore, the present invention provides a method and device for forming, by a plurality of devices, a group for transmitting and receiving voice data using the Bluetooth technology.

Furthermore, the present invention provides a method and device for determining and configuring a master device for forming a group using the Bluetooth technology.

Furthermore, the present invention provides a method and device for configuring a slave device that configures a group.

Furthermore, the present invention provides a method and device for adding and/or deleting a device to and/or from a group formed using the Bluetooth technology.

Technical objects to be achieved in this specification are not limited to the aforementioned object, and those skilled in the art to which the present invention pertains may evidently understand other technological objects from the following description.

Technical Solution

There are provided a method and device for transmitting and receiving data by a first device using Bluetooth.

Specifically, a method of transmitting and receiving data by a first device using Bluetooth according to an embodiment of the present invention includes generating a group for group communication with a plurality of devices, exchanging configuration information of the group for the group communication with the plurality of devices, forming a Bluetooth connection with the plurality of devices based on the configuration information, wherein the Bluetooth connection is formed using a broadcasting channel or a time division scheme for simultaneously connecting to the plurality of devices, and transmitting and receiving voice data to and from the plurality of devices using a specific channel.

Furthermore, in the present invention, the step of generating the group includes forming a Bluetooth LE connection with a controller and receiving a first write message, including second configuration information for generating the group, from the controller. The second configuration information includes at least one of role information indicating a role in the group, a group ID for identifying the group, or a node ID for identifying the first device in the group.

Furthermore, in the present invention, the step of generating the group further includes receiving, from the controller, a second write message including additional information for the transmission and reception of the voice data.

Furthermore, in the present invention, the configuration information includes at least one of a group ID for identifying the group or codec information indicating a codec for the modulation and demodulation of the voice data.

Furthermore, in an embodiment of the present invention, the method further includes exchanging, with each of the plurality of devices, identity resolving keys (IRKs) for the use of an encrypted address and encryption keys for the secure transmission of the voice data.

Furthermore, in the present invention, the step of forming the Bluetooth connection includes transmitting, to the plurality of devices, an advertising message using the broadcasting channel or the time division scheme. The advertising message includes a group ID for identifying the group and receiving, from each of the plurality of devices, a connection request message as a response to the advertising message.

Furthermore, in the present invention, the connection request message includes a connection interval parameter indicating the interval at which data is transmitted and received and a latency parameter indicating the number of deactivated connection events.

Furthermore, in the present invention, the connection interval parameter and the latency parameter are differently configured in each of the plurality of devices.

Furthermore, in the present invention, when the first device plays a role as a client, the voice data is transmitted to the plurality of devices through a write request message. The voice data is written in a specific characteristic of the plurality of devices.

Furthermore, in the present invention, when the first device plays a role as a server, the voice data is transmitted to the plurality of devices through an indication message. A specific characteristic for transmitting the voice data of the first device includes a client descriptor configured to transmit the indication message when the voice data is generated.

Furthermore, an embodiment of the present invention provides a first device for transmitting and receiving data using Bluetooth, including a communication unit configured to perform communication with an outside in a wireless or wired manner, memory configured to store data, and a processor functionally connected to the communication unit. The processor is configured to generate a group for group communication with a plurality of devices, exchange configuration information of the group for the group communication with the plurality of devices, form a Bluetooth connection with the plurality of devices based on the configuration information, the Bluetooth connection is formed using a broadcasting channel or a time division scheme for simultaneously connecting to the plurality of devices, and transmit and receive voice data to and from the plurality of devices using a specific channel.

Furthermore, in the present invention, the processor is configured to form a Bluetooth LE connection with a controller and receive a first write message, including second configuration information for generating the group, from the controller. The second configuration information includes at least one of role information indicating a role in the group, a group ID for identifying the group, or a node ID for identifying the first device in the group.

Furthermore, in the present invention, the processor is configured to receive, from the controller, a second write message including additional information for the transmission and reception of the voice data.

Furthermore, in the present invention, the processor is configured to exchange, with each of the plurality of devices, IRKs for the use of an encrypted address and encryption keys for secure transmission of the voice data.

Furthermore, in the present invention, the processor is configured to transmit, to the plurality of devices, an advertising message using the broadcasting channel or the time division scheme, the advertising message includes a group ID for identifying the group, and receive, from each of the plurality of devices, a connection request message as a response to the advertising message.

Advantageous Effects

In accordance with the method and device for transmitting and receiving voice data using the Bluetooth technology according to an embodiment of the present invention, there is an effect in that voice data can be transmitted and received using the Bluetooth technology.

Furthermore, according to the present invention, there is an effect in that devices configuring a group can transmit and receive voice data using Bluetooth.

Furthermore, according to the present invention, there is an effect in that a group for transmitting and receiving voice data can be formed using Bluetooth.

Furthermore, according to the present invention, there is an effect in that a master device for managing a group can be determined and configured.

Furthermore, according to the present invention, there is an effect in that a slave device configuring a group can be configured.

Furthermore, according to the present invention, there is an effect in that a device can be added to or deleted from a group formed through Bluetooth.

Effects which may be obtained in this specification are not limited to the aforementioned effects, and various other effects may be evidently understood by those skilled in the art to which the present invention pertains from the following description.

DESCRIPTION OF DRAWINGS

The accompany drawings, which are included as part of the detailed description in order to help understanding of the present invention, provide embodiments of the present invention and describe the technical characteristics of the present invention along with the detailed description.

FIGS. 10 and 11 are flowcharts showing examples of a method for forming a Bluetooth connection between devices configuring a group and a data packet, which are proposed in this specification.

MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Figure 1:
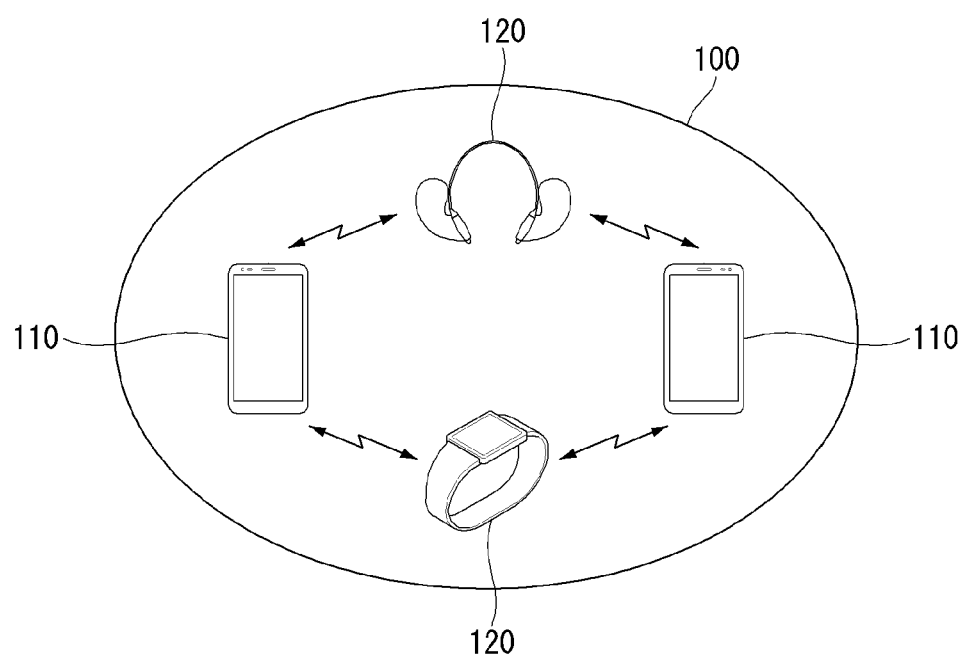
FIG. 1 is a schematic diagram showing an example of a wireless communication system using a Bluetooth low energy technology proposed in this specification.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, or the like.

The client device 110 may also be called as master device, master, client, member, sensor device, sink device, collector, third device, fourth device and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Figure 2:
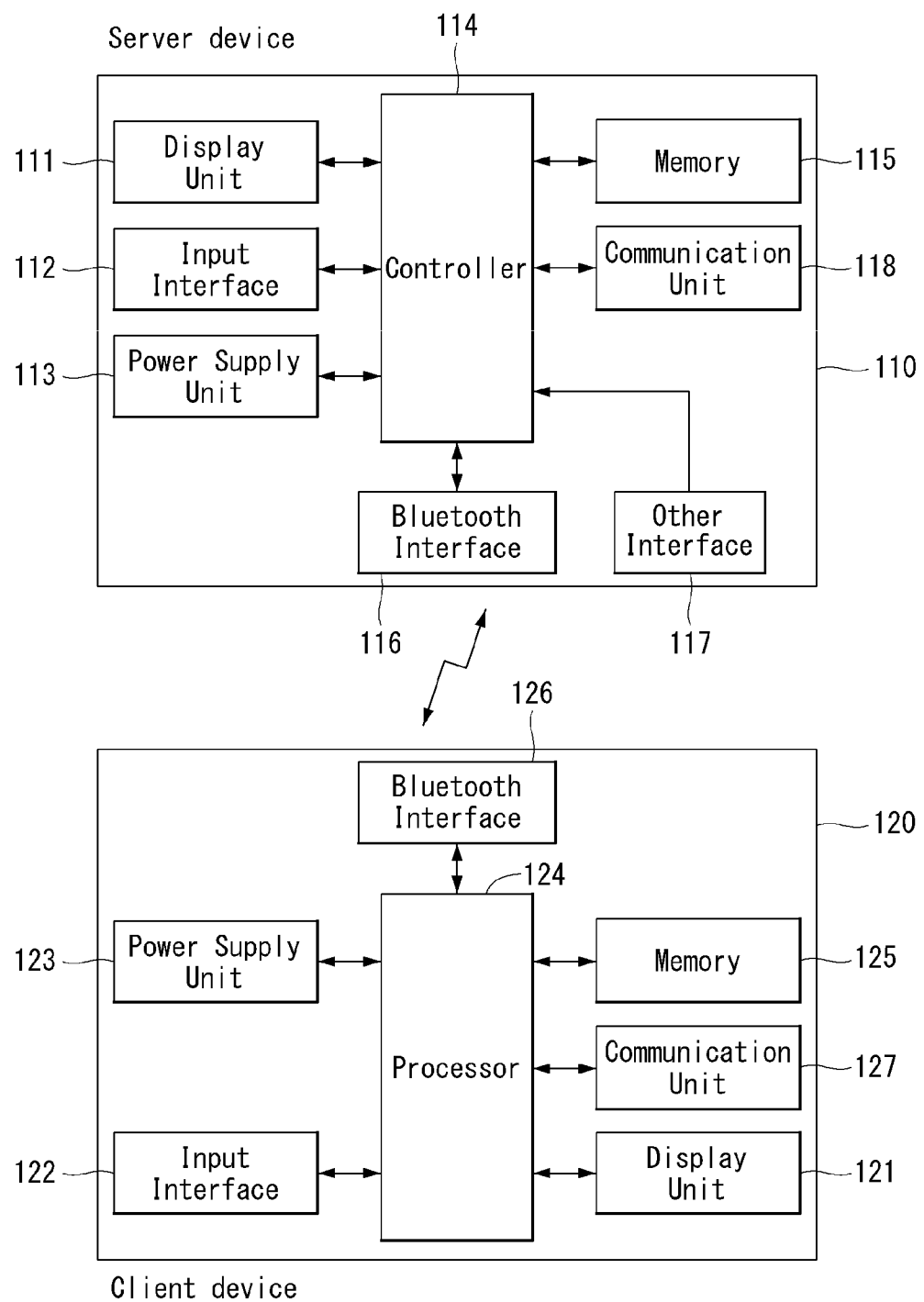
FIG. 2 shows an example of an internal block diagram of a device capable of implementing methods proposed in this specification.

FIG. 2 shows an example of an internal block diagram of a device capable of implementing methods proposed in this specification.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device.

The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers.

As described above, the BLE technology has a small duty cycle and can significantly reduce power consumption through a low data transfer rate.

The user input interfaces 112 and 122 refer to modules providing a user input such as a screen button to the controllers to enable the user to control an operation of the devices.

Figure 3:
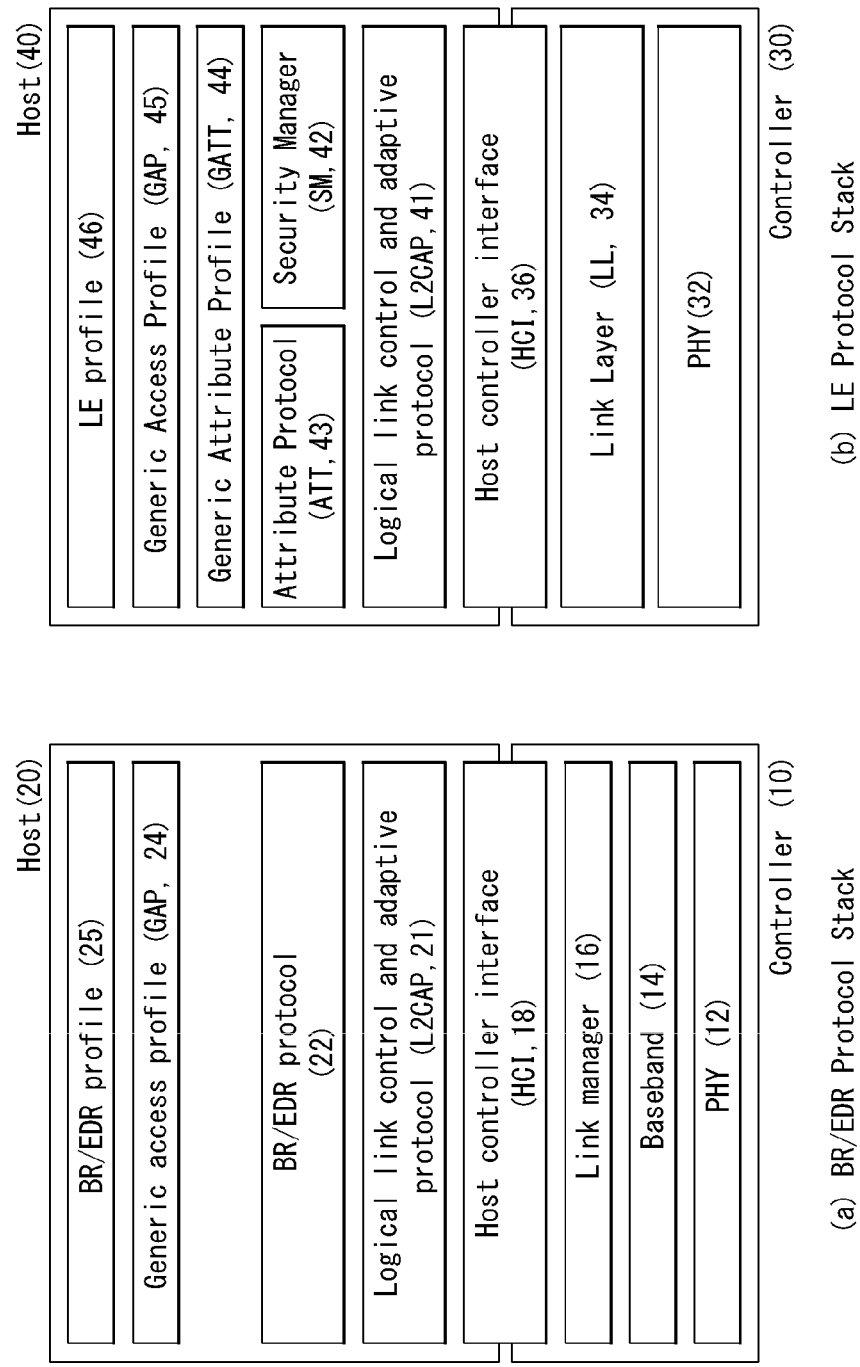
FIG. 3 is a diagram showing an example of a Bluetooth communication architecture to which methods proposed in this specification may be applied.

FIG. 3 is a diagram showing an example of a Bluetooth communication architecture to which methods proposed in this specification may be applied.

Referring to FIG. 3, FIG. 3(a) shows an example of a protocol stack of Bluetooth Basic Rate (BR)/Enhanced Data Rate (EDR), and FIG. 3(b) shows an example of a protocol stack of Bluetooth Low Energy (LE).

In detail, as illustrated in (a) of FIG. 3, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The controller stack 10 may include a PHY layer 12, a link controller 14, and a link manager 16.

The PHY layer 12 is a layer in which 2.4 GHz radio signals are transmitted and receives, and may transmit data by hopping 79 RF channels if Gaussian frequency shift keying (GFSK) modulation is used.

The link controller 14 is responsible for the transmission of a digital signal, selects a channel sequence that hops 1400 times per second, and transmits a time slot of 625 us in length for each channel.

The Link Manager layer 16 controls overall operations (link setup, control and security) of a Bluetooth connection by utilizing Link Manager Protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define service (profile) using Bluetooth BR/EDR and an application protocol for exchanging their data. The generic access profile (GAP) 24 defines device discovery, a connection and a security level.

As shown in FIG. 4(b), the Bluetooth LE protocol stack includes a controller stack 30 capable of operating to process a wireless device interface whose timing is important and a host stack 40 capable of operating to process high level data.

First, the controller stack 30 may be implemented as a communication module which may include a Bluetooth wireless device, for example, a processor module which may include a processing device, such as a microprocessor.

The host stack may be implemented as part of an OS operating on the processor module or as the instantiation of a package on the OS.

In some examples, the controller stack and the host stack may operate or may be executed on the same processing device within the processor module.

The controller stack 30 includes a physical layer (PHY) 32, a link layer 34 and a host controller interface 36.

The physical layer (PHY, wireless transmission and reception module) 32 is a layer in which 2.4 GHz radio signals are transmitted and received, and uses Gaussian frequency shift keying (GFSK) modulation and a frequency hopping scheme configured with 40 RF channels.

The link layer 34 functioning to transmit or receive a Bluetooth packet performs an advertising, scanning function using three advertising channels, then generates a connection between devices, and provides a function for exchanging a data packet having a maximum of 257 bytes through 37 data channels.

The host stack may include a logical link control and adaptation protocol (L2CAP) 41, a security manager (SM) 42, an attribute protocol (ATT) 43, a generic attribute profile (GATT) 44, a generic access profile 45, and an LE profile 46. However, the host stack 40 is not limited thereto, and may include various protocols and profiles.

The host stack multiplexes various protocols or profiles provided by Bluetooth higher using the L2CAP.

First, the L2CAP 41 may provide one bi-direction channel for transmitting data to a specific protocol or profile.

The L2CAP 41 may operate to multiplex data between high layer protocols, segment and reassemble packages, and management multi-cast data transmission.

In Bluetooth LE, three fixed channels (one for a signaling CH, one for a Security Manager, and one for an Attribute protocol) are basically used. Furthermore, a dynamic channel may be used, if necessary.

In contrast, in the Basic Rate/Enhanced Data Rate (BR/EDR), a dynamic channel is basically used, and a protocol service multiplexer, retransmission, a streaming mode, etc. are supported.

The security manager (SM) 42 is a protocol for authenticating a device and providing a key distribution, and is responsible for the entire security of Bluetooth LE.

The attribute protocol (ATT) 43 is a server-client structure, and defines a rule for accessing the data of a device. The ATT includes the following 6 message types (Request, Response, Command, Notification, Indication, Confirmation).

① Request and Response message: a Request message is a message through which a client device requests and deliver specific information from and to a server device. A Response message is a message as a response to a Request message and is a message which may be used for transmission from a server device to a client device.

② Command message: this is a message transmitted from a client device to a server device in order to indicate a command of a specific operation. A server device does not transmit a response to a Command message to a client device.

③ Notification message: this is a message through which a server device transmits notification, such as an event, to a client device. A client device does not transmit a confirm message for a Notification message to a server device.

④ Indication and Confirm message: this is a message through which a server device transmits notification, such as an event, to a client device. Unlike in the Notification message, a client device transmits a confirm message for an Indication message to a server device.

The generic access profile 45 is a layer newly implemented for the Bluetooth LE technology, and is used to select a role for communication between Bluetooth LE devices and to control how a multi-profile operation is performed.

Furthermore, the generic access profile 45 is chiefly used in device discovery, connection generation and security procedure parts, and it defines a scheme for providing information to a user and defines the type of the following attributes.

Service: define basic operations of a device as a combination of behaviors related to data ② Include: define the relation between services ③ Characteristics: a data value used in service ④ Behavior: a computer-readable format defined as a universal unique identifier (UUID) (value type)

The LE profile 46 is a profile having dependency on the GATT and is chiefly applied to a Bluetooth LE device. The LE profile 46 may include Battery, Time, FindMe, Proximity, Time, for example, and the detailed contents of the GATT-based Profiles are as follows.

Battery: battery information exchange method
Time: time information exchange method
FindMe: provide alarm service according to the distance
Proximity: battery information exchange method
Time: time information exchange method The generic attribute profile (GATT) 44 may operate as a protocol that describes how the attribute protocol 43 is used when services are configured. For example, the generic attribute profile (GATT) may operate to regulate how the ATT attributes are grouped along with services, and may operate to describe characteristics associated with services.

Accordingly, the generic attribute profile (GATT) and the attribute protocol (ATT) 43 may use characteristics in order to describe the state and services of a device and to describe how the characteristics are related and how they are used.

Hereinafter, procedures of the Bluetooth low energy (BLE) technology are described in brief.

The BLE procedures may be classified into a device filtering procedure, an advertising procedure, a scanning procedure, a discovering procedure, a connection procedure, etc.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

An advertising device performs an advertising procedure in order to perform nondirectional broadcast to devices within an area.

In this case, the non-directional broadcast refers to broadcast in all directions not broadcast in a specific direction.

In contrast, directional broadcast refers to broadcast in a specific direction. Non-directional broadcast occurs without a connection procedure between devices having a listening (or hearing) state with an advertising device (hereinafter referred to as a "listening device").

The advertising procedure is used to establish a Bluetooth connection with an initiating device nearby.

Or, the advertising procedure may be used to provide periodical broadcast of user data to scanning devices performing listening in an advertising channel In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel The scanning device transmits a scan request to an advertising device through an advertising physical channel in order to request additional data from the advertising device.

The advertising device transmits a scan response as a response with respect to the scan request, by including additional user data which has requested by the scanning device through an advertising physical channel The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

Figure 4:
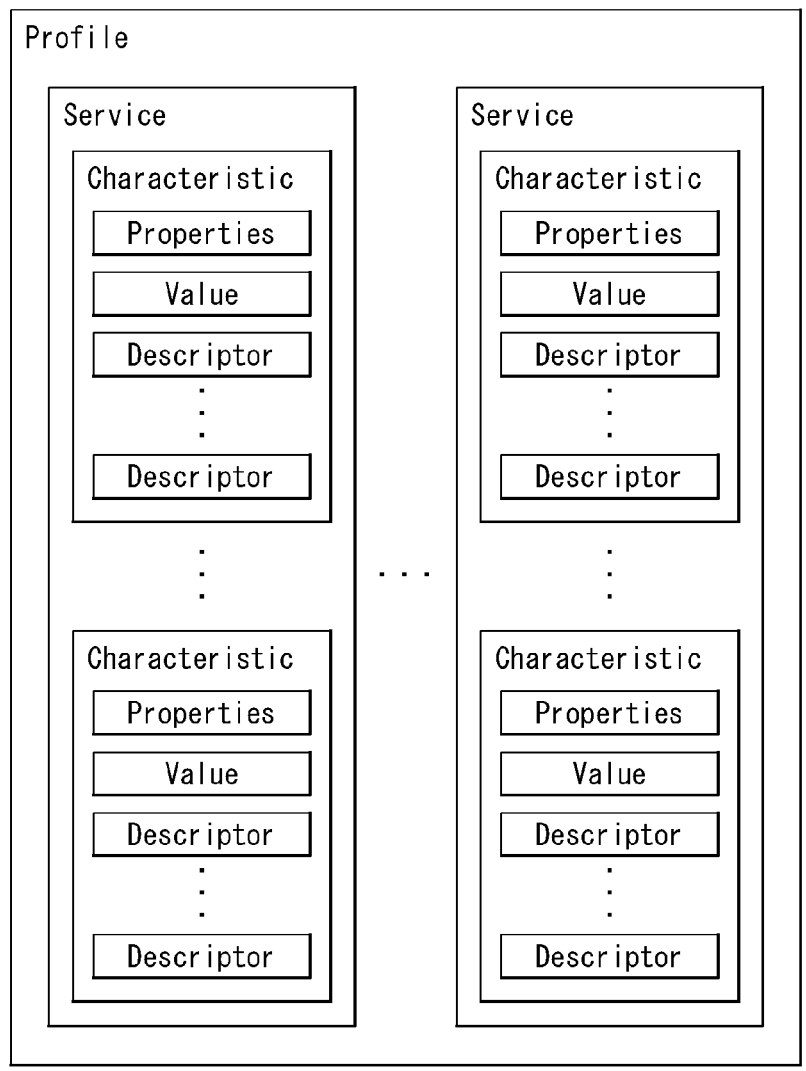
FIG. 4 is a diagram showing an example of the structure of a generic attribute profile (GATT) of Bluetooth low energy.

FIG. 4 is a diagram showing an example of the structure of a generic attribute profile (GATT) of Bluetooth low energy.

From FIG. 4, a structure for a profile data exchange of Bluetooth low energy may be seen.

Specifically, the generic attribute profile (GATT) defines a method of exchanging data using services, characteristics between Bluetooth LE devices.

In general, a peripheral device (e.g., sensor device) plays a role as a GATT server and has definition for a service, characteristic. A central device plays a role as a GATT client.

In order to read or write data, a GATT client sends a data request to the GATT server, and every operation (transaction) is started by the GATT client and a response is received from the GATT server.

Figure 5:
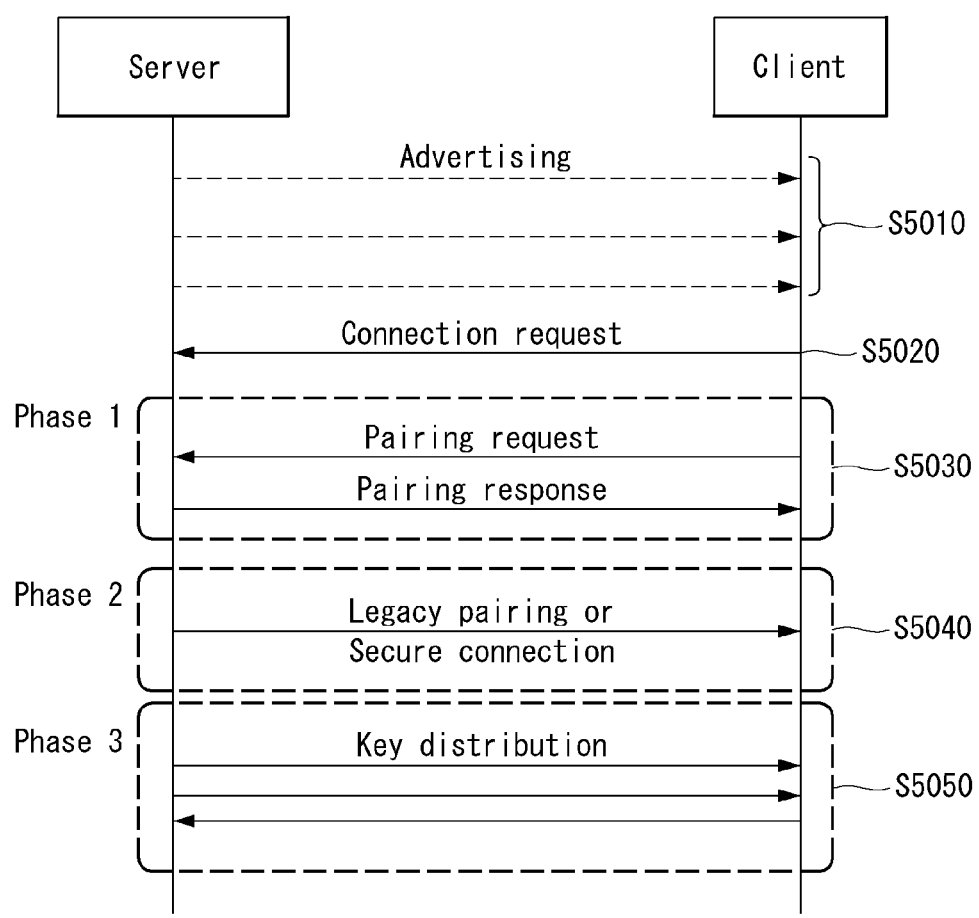
FIG. 5 is a flowchart showing an example of a connection procedure method in a Bluetooth low energy technology to which the present invention may be applied.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute FIG. 5 is a flowchart showing an example of a connection procedure method in a Bluetooth low energy technology to which the present invention may be applied.

A server transmits an advertising message to a client through three advertising channels (S5010).

The server may be called an advertiser prior to a connection, and may be called a master after a connection. The server may be a sensor (temperature sensor, etc.), for example.

Furthermore, the client may be called a scanner prior to a connection and may be called a slave after a connection. The client may be a smartphone, for example.

As described above, Bluetooth is divided into a total of 40 channels and performs communication through a 2.4 GHz band. The three of the 40 channels are advertising channels and are used for the exchange of packets exchanged to set up a connection including various advertising packets.

The remaining 37 channels are data channels and used for the exchange of data after a connection.

After receiving the advertising message, the client may transmit a Scan Request message to the server in order to obtain additional data (e.g., server device name)

In this case, the server transmits a Scan Response message, including additional data, to the client as a response to the Scan Request message.

In this case, each of the Scan Request message and the Scan Response message is one kind of an advertising packet. The advertising packet may include only user data of 31 bytes or less.

Accordingly, if the size of data is greater than 3 bytes, but there is data having overhead in transmitting the data after a connection is set up, the data is divided and transmitted twice using the Scan Request message/Scan Response message.

Next, the client transmits, to the server, a Connection Request message for a Bluetooth connection configuration with the server (S5020).

A Link Layer LL connection is established between the server and the client through the Connection Request message.

Thereafter, the server and the client perform a security setup procedure.

The security setup procedure may be interpreted as Secure Simple Pairing and may be performed, including the Secure Simple Pairing.

That is, the security setup procedure may be performed through Phase 1 to Phase 3.

Specifically, the server and the client perform a pairing procedure (Phase 1) (S5030).

In the pairing procedure, the client transmits a Pairing Request message to the server, and the server transmits a Pairing Response message to the client.

Authentication requirements and input (I)/output (O) capabilities and key size information are exchanged between the devices through the pairing procedure. Which Key generation method will be used is determined in Phase 2 based on the information.

Next, in Phase 2, the server and the client perform legacy pairing or security connection (S5040).

In Phase 2, a temporary key and short term key (STK) of 128 bits on which legacy pairing is performed are generated.

Temporary Key: a key produced to generate an STK

Short Term Key (STK): a key value used to produce an encrypted connection between devices If a security connection is performed in Phase 2, a long term key (LTK) of 128 bits is generated.

Long Term Key (LTK): a key value used for a subsequent connection in addition to an encrypted connection between devices Next, in SSP Phase 3, a key distribution procedure is performed between the server and the client (S5050).

A security connection is established between the server and the client through the key distribution procedure. An encrypted link is formed, so data can be transmitted and received.

As described above, Bluetooth is a network technology capable of transmitting and receiving data based on a one-to-one connection.

However, Bluetooth has a problem in that a method of forming, by a plurality of devices, a group for providing a specific object or a specific service because it is based on a one-to-one connection.

Accordingly, in order to solve such a problem, the present invention proposes a method of forming, by a plurality of devices, a group using Bluetooth and transmitting and receiving data (e.g., voice data) between devices configuring the formed group.

Figure 6:
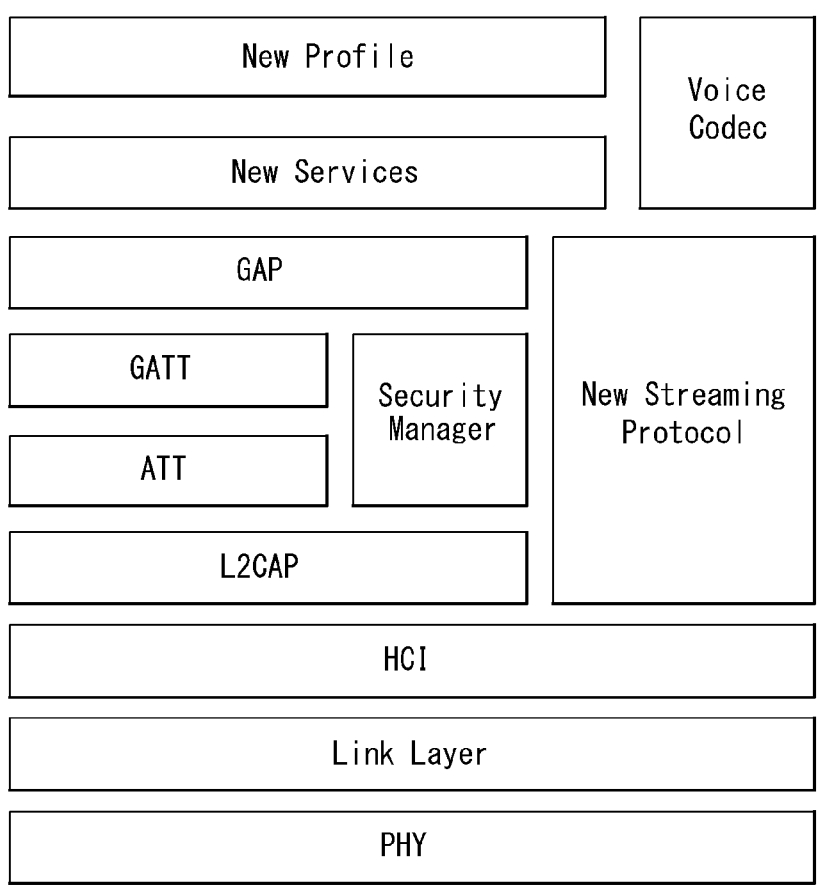
FIG. 6 is a diagram showing an example of a Bluetooth communication architecture for forming, by a plurality of devices, a group using Bluetooth proposed in this specification and transmitting and receiving voice data.

FIG. 6 is a diagram showing an example of a Bluetooth communication architecture for forming, by a plurality of devices, a group using Bluetooth proposed in this specification and transmitting and receiving voice data.

Referring to FIG. 6, a new Bluetooth communication architecture for forming a group through Bluetooth and providing a service (hereinafter referred to as a "push talk over Bluetooth (PoB) service) for transmitting and receiving data between devices configuring the formed group may be applied.

Hereinafter, other parts other than the same part as the Bluetooth architecture part described in FIG. 3 are chiefly described.

Specifically, the Bluetooth communication architecture for providing the PoB service may be configured with a New Profile, a New Service, a Voice Codec, a Gap, a GATT, an ATT, a Security Manager, a New Streaming Protocol, an L2CAP, an HCI, a Link Layer, and a PHY.

First, the New Profile means a profile for providing the PoB service. The New Services mean services streaming setup, a transmission authority configuration and/or group management for providing the PoB service.

The Voice Codec provides a codec function for the encoding/decoding of voice/video data transmitted and received through the PoB service.

In this case, each device may support one or a plurality of codecs for the encoding/decoding of voice data. Devices that transmit and receive voice data may encode/decode the voice data using the same codec of the supported codecs.

The Security Manager provides a security function, such as the authentication of a user and group for providing the PoB service, an encryption engine in addition to the functions described in FIG. 4.

The New Streaming Protocol provides a new streaming protocol for transmitting and receiving voice data of the PoB service.

The HCI provides an HCI Command and an event for providing the PoB service in addition to the functions described in FIG. 4.

The Link Layer provides a function for unicast, multi-cast and time synchronization for providing the PoB service in addition to the functions described in FIG. 4. The PHY provides a function for transmitting and receiving voice data between devices present in a long distance of 100 m or more.

A group may be formed between devices supporting Bluetooth through such a protocol stack. Devices configuring the same group may transmit and receive voice data.

Figure 7:
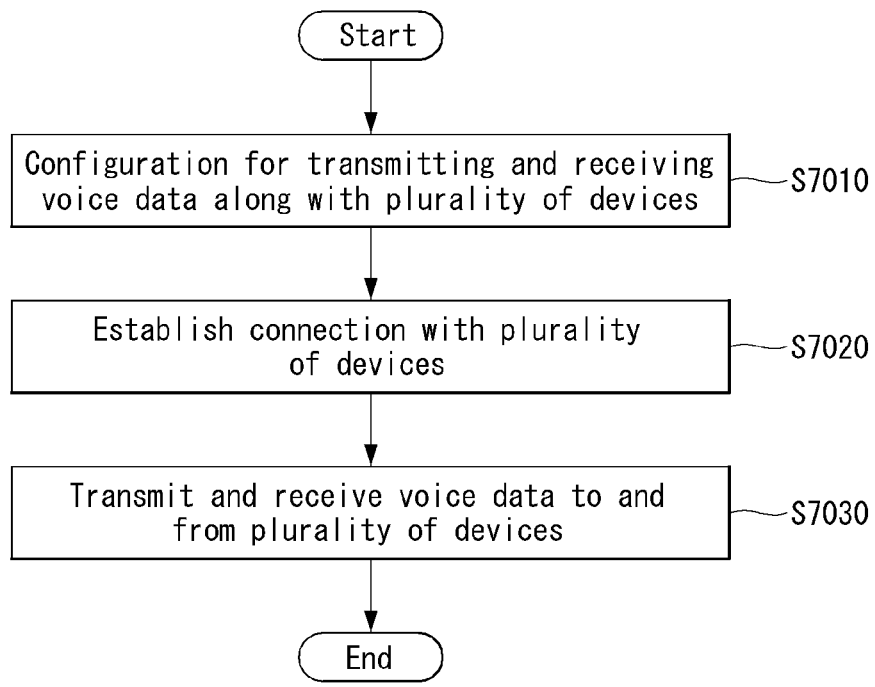
FIG. 7 is a flowchart showing an example of an operation for forming a group and transmitting and receiving voice data, which is proposed in this specification.

FIG. 7 is a flowchart showing an example of an operation for forming a group and transmitting and receiving voice data, which is proposed in this specification.

Referring to FIG. 7, a device for providing a specific service may form a group with a plurality of devices supporting Bluetooth, and may transmit and receive data for providing a specific service.

Hereinafter, the above-described PoB service is described as an example. However, the present invention is not limited thereto and may be applied to various services.

Furthermore, in the present invention, a device transmitting voice data is called a sender, and a device receiving voice data is called a receiver. Each of the sender and the receiver is a name according to the data transmission and reception direction of each device, and each device may be a sender and/or a receiver.

Specifically, a specific device attempting to provide a PoB service may perform a configuration procedure for transmitting and receiving voice data along with a plurality of devices supporting Bluetooth (S7010).

The configuration procedure is a procedure for forming a group for voice data transmission and reception between the plurality of devices and exchanging configuration information for a Bluetooth connection. The specific device may form a group for providing the PoB service along with the plurality of devices through the configuration procedure.

In this case, the information exchange needs to be performed N (N+2/2) times when the number of specific device and plurality of device is N+1.

The specific device may exchange bonding information with the plurality of devices and store it through the configuration procedure. Accordingly, a Bluetooth connection can be rapidly established because a pairing procedure does not need to be subsequently performed due to bonding information stored in a connection procedure.

The specific device that has performed the configuration procedure along with the plurality of devices may establish a Bluetooth connection with the plurality of devices in order to transmit and receive voice data (S7020).

Specifically, the specific device may establish a Bluetooth connection with each of the plurality of devices that has formed the group through a time division scheme or a broadcast channel for establishing a Bluetooth connection with the plurality of devices.

If the plurality of device is N, the specific device may establish N Bluetooth connections.

If the specific device establishes a Bluetooth connection using the time division scheme, the specific device may establish Bluetooth connections with a plurality of devices, respectively, at different times.

In this case, the specific device may configure a connection event for data transmission and parameters related to latency after a connection through a connection request message.

In this case, the connection event and the parameters related to latency may be configured by taking into consideration a minimum amount of transmission data to a minimum amount of transmission data of voice data after a codec for transmitting and receiving voice data is applied.

The specific device that has established N Bluetooth connections with the plurality of devices may transmit and receive voice data to and from the plurality of devices based on a configured parameter value (S7030).

Specifically, the specific device may transmit voice data to each of the devices based on the configured parameter in the connection event interval of each of the plurality of devices.

In this case, the specific device may encode voice data using one of codecs supported by the specific device and a sender that receives the voice data, and may transmit the encoded voice data to the sender using the above-described GATT protocol.

A specific device may form a group with a plurality of devices through Bluetooth using such a method and may transmit and receive voice data to and from each of the devices that have formed the group.

Configuration Procedure

Figure 8:
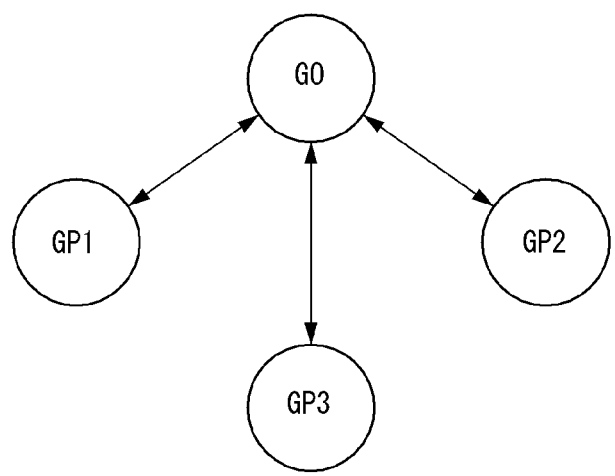
FIGS. 8 and 9 are diagrams showing examples for forming a group, which are proposed in this specification.
Figure 9:
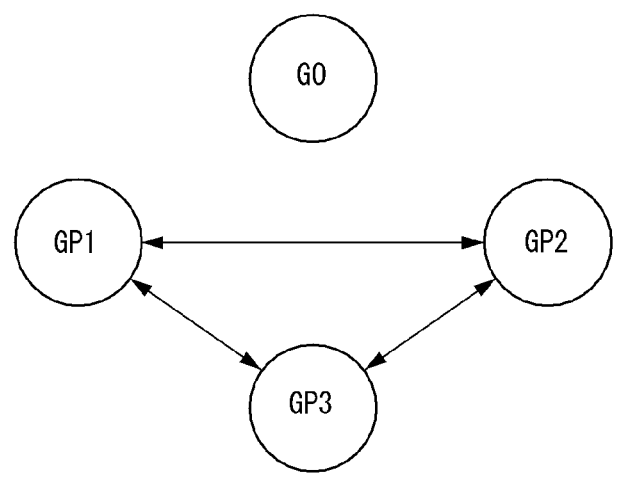

FIGS. 8 and 9 are diagrams showing examples for forming a group, which are proposed in this specification.

Referring to FIGS. 8 and 9, FIG. 8 shows an example of a method of generating a group, and FIG. 9 shows an example of a method of configuring individual security between devices configuring a group.

FIG. 8 shows an example of a method of generating a group.

Specifically, as shown in FIG. 8, a group owner (GO), that is, a GO forming and managing a group, may transmit Group IDs to devices, that is, group participants (GPs) configuring a group, in order to notify the GPs that one group is formed.

In this case, the same ID is transmitted as the Group ID transmitted to each of the GPs.

The Group ID transmitted to each of the GPs may be subsequently used to indicate that the GPs are the same group in a procedure for establishing a Bluetooth connection.

Furthermore, if the GPs support a plurality of codecs, the GO may determine a codec for the encoding and decoding of voice data from among the plurality of codecs, and may notify the GPs of the determined codec.

FIG. 9 shows an example of a method of configuring individual security between devices configuring a group.

Specifically, as shown in FIG. 9, a GO and GPs configuring one group need to have obtained information of all the devices (e.g., the address of the device) forming the group other than itself in order to establish each Bluetooth connection.

In this case, each device may use an identity resolving key (IRK) in order to use an encrypted address through a Privacy mode. The IRK may be substituted with a Group ID.

Furthermore, if each device requires secure transmission, devices may exchange encryption keys, may encrypt data, and may transmit and receive the data.

Connection Procedure

Figure 10:
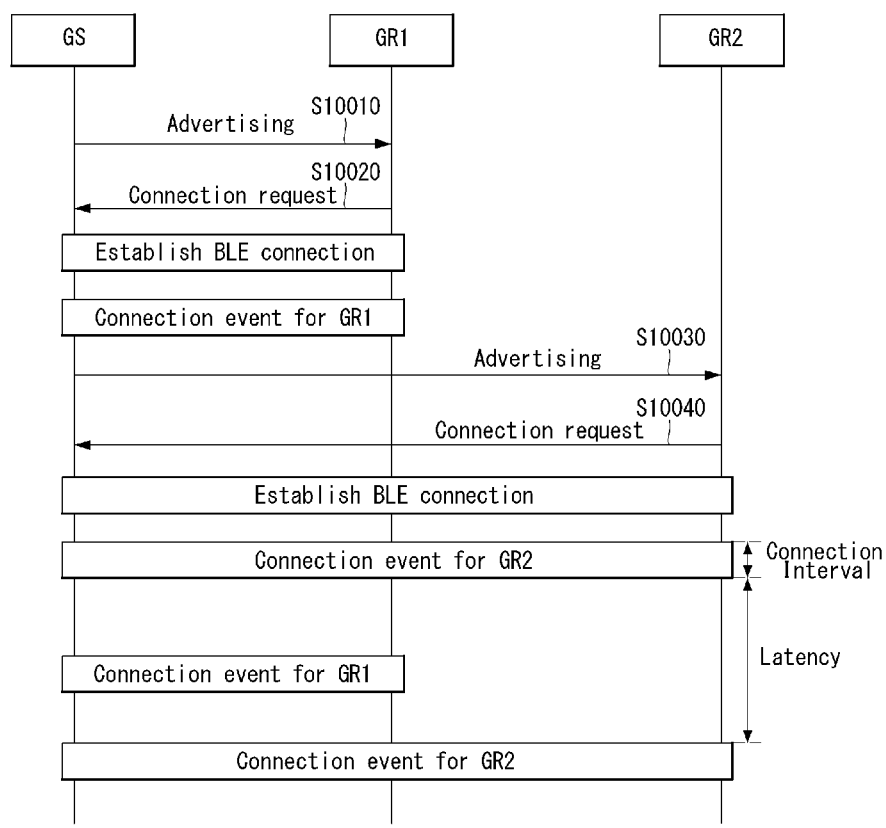
Figure 11:
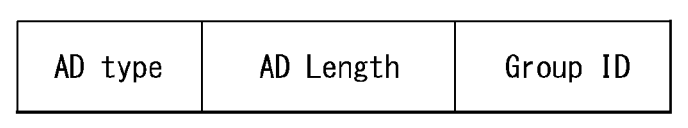

FIGS. 10 and 11 are flowcharts showing examples of a method for forming a

Bluetooth connection between devices configuring a group and a data packet, which are proposed in this specification.

Referring to FIGS. 10 and 11, a specific device that has formed a group along with a plurality of device may establish a Bluetooth connection with the plurality of devices in order to transmit and receive voice data.

All the devices configuring the group may become senders or receivers.

Hereinafter, a specific device is called a group sender (GS) for transmitting voice data, and each of the plurality of devices is called a group receiver (GR) for receiving voice data.

As shown in FIG. 10, a GS may establish a Bluetooth connection based on Scanning along with GRs.

Specifically, if all the GRs perform Scanning and the GS has voice data for providing a PoB service, an advertising packet for a Bluetooth connection may be transmitted to each of the GRs.

In this case, if a broadcast channel for establishing a connection with the GRs is used, a specific device may establish the connection by transmitting an advertising packet to the plurality of devices forming a group.

In this case, the advertising packet may include a Group ID and the address of each of the plurality of devices attempting to form the connection.

However, if the connection is established using a time division scheme, as shown in FIG. 10, the GS may establish a Bluetooth connection with each of the GRs through an individual connection procedure.

Specifically, the GS may transmit, to the GR 1, an advertising packet for a Bluetooth connection (S10010).

In this case, the advertising packet may include an AD type, an AD length and a Group ID, as shown in FIG. 10.

The advertising packet transmitted by the GS is broadcasted to all surrounding devices, but only devices forming a group indicated by a Group ID may respond to the advertising packet transmitted by the GS because the advertising packet includes the Group ID.

In this case, if additional information is necessary, it may be obtained through a scan request message and a scan response message as described above.

The GR 1 may transmit a connection request message to the GS as a response to the advertising packet, and may establish a Bluetooth connection (S10020).

In this case, the connection request message may include the following connection parameter values for data transmission and reception after a Bluetooth connection is established.

Connection Interval: the interval of a connection event for data transmission and reception SlaveLatency: the number of inactive connection events in which data is not transmitted and received The GS that has established the Bluetooth connection with the GR 1 may transmit and receive voice data to and from the GR 1 during a configured connection event interval through the connection request message using a specific channel for voice data transmission and reception.

In this case, the specific channel may be an isochronous channel for transmitting and receiving voice data in Bluetooth.

Thereafter, the GS may transmit voice data to the GR 2 by performing the same procedure on the GR 2 (S10030, S10040).

Connection parameter values of the GR 1 and the GR 2 may be differently set in order to avoid a collision of data transmission.

In another embodiment of the present invention, the GS may establish a Bluetooth connection with GRs based on advertising.

Specifically, the GRs periodically broadcast the advertising packet, shown in FIG. 11, to surrounding devices.

If a GP has voice data occurred, it may establish a Bluetooth connection with the GRs by transmitting a connection request message as a response to the advertising message transmitted by each of the GRs.

In this case, the GP may be aware of whether the GRs that have transmitted the advertising packets belong to the same group through a Group ID included in the advertising packet transmitted by the GR.

However, in a connection based on advertising, a collision may occur between advertising packets because the advertising packets may be transmitted by a plurality of GRs at the same time. Accordingly, in order to avoid such a collision, time and/or a cycle in which the advertising packets are transmitted may be differently configured between the GRs.

Figure 12:
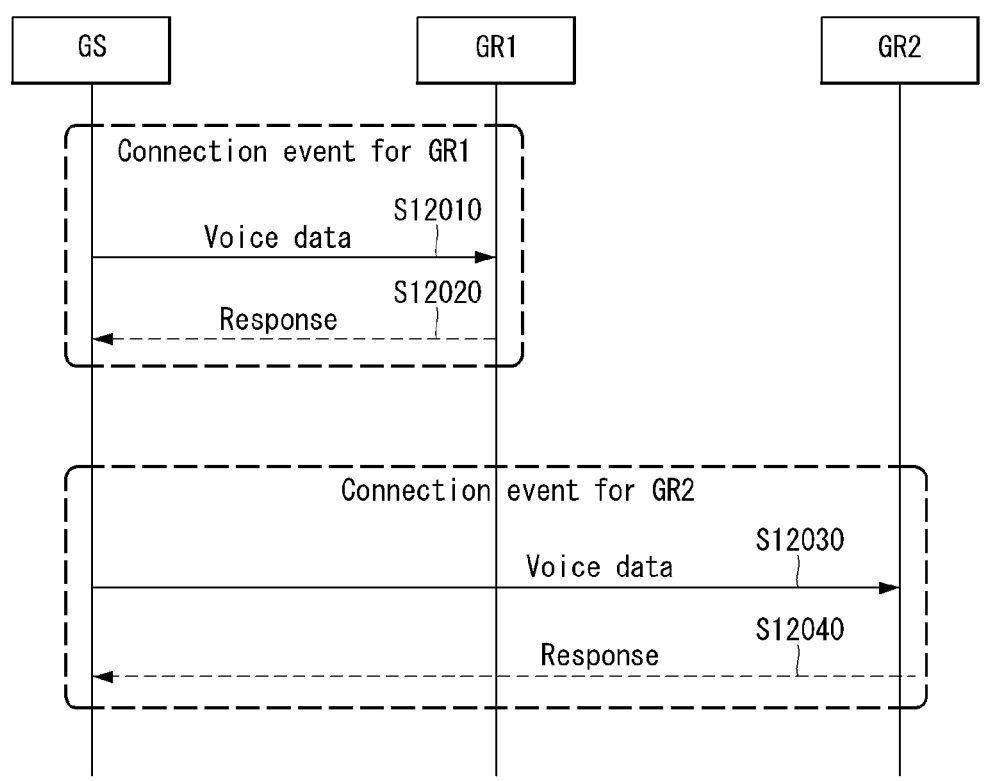
FIG. 12 is a flowchart showing an example of a method of transmitting and receiving voice data between devices configuring a group, which is proposed in the present invention.

FIG. 12 is a flowchart showing an example of a method of transmitting and receiving voice data between devices configuring a group, which is proposed in the present invention.

Referring to FIG. 12, a GP that has established a Bluetooth connection with GRs may transmit voice data to the GRs in the connection event interval of each of the GRs.

Specifically, if a GS that has established a Bluetooth connection with GRs based on the Scanning or Advertising described in FIG. 11 has voice data to be transmitted to the GRs, it may transmit the voice data to a GR 1 during a connection event interval for the GR 1 (S12010).

In this case, the GS may transmit the voice data to the GR 1 through two methods.

First, if the GS operates as a GATT Client and the GR 1 operates as a GATT Server, the GS may transmit the voice data to the GR 1 through a Write Command or a Write Request.

If the GS transmits the voice data through the Write Command, the GR 1 does not transmit a response thereto.

However, if the GS transmits the voice data through the Write Request, the GR 1 may transmit a response thereto to the GS (S12020).

Furthermore, the voice data may be re-transmitted to the GR 1 through a write request message. For example, if the GS has transmitted voice data, but the GR 1 has not successfully received the voice data, the GS may transmit the same voice data to the GR 1 again through a Write Request.

Thereafter, the GS may transmit the same voice data to the GR 2 through a Write Command or Write Request in the same manner as the GR 1 (S12030), and may receive a response thereto (S12040).

Second, if the GS operates as a GATT Server and the GR 1 operates as a GATT Client, the GS may transmit the voice data to the GR 1 through notification or indication (S12010).

In this case, if voice data has occurred, a Client Character Descriptor needs to be configured so that the GS operating as a GATT Server can transmit the voice data to the GR 1 and the GR 2.

For example, if voice data has occurred and a value of a characteristic in which the voice data of the GS is changed, the Client Characteristic Descriptor of the characteristic in which the voice data is stored needs to be configured/added so that the GS can transmit the changed value of the characteristic to the GR 1 and the GR 2 operating as GATT Clients through notification or indication.

If the GS transmits the voice data through notification, the GR 1 does not transmit a response thereto.

However, if the GS transmits the voice data through indication, the GR 1 may transmit a response thereto to the GS (S12020).

Furthermore, the GS may re-transmit the voice data to the GR 1 through a write request message. For example, if the GS has transmitted voice data, but the GR 1 has not successfully received the voice data, the GS may transmit the same voice data to the GR 1 again through a Write Request.

Thereafter, the GS may transmit the same voice data to the GR 2 through notification or indication in the same manner as the GR 1 (S12030), and may receive a response thereto (S12040).

When the transmission of the voice data to the GR 1 and the GR 2 is completed through the two methods, the GS releases a Bluetooth connection by transmitting a message (e.g., LL_Terminate message) for connection release to the GR 1 and the GR 2.

Through such a method, the GS may transmit voice data to the GRs of the same group.

Figure 13:
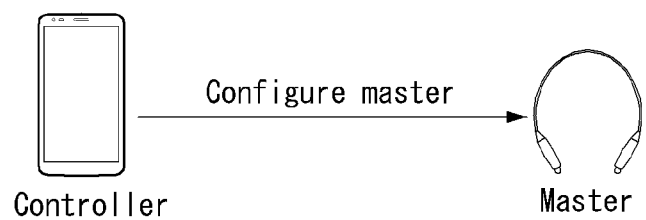
FIGS. 13 and 14 are diagrams showing examples of a method of configuring a device that will play a role as a master that generates and manages a group, which is proposed in the present invention.
Figure 14:
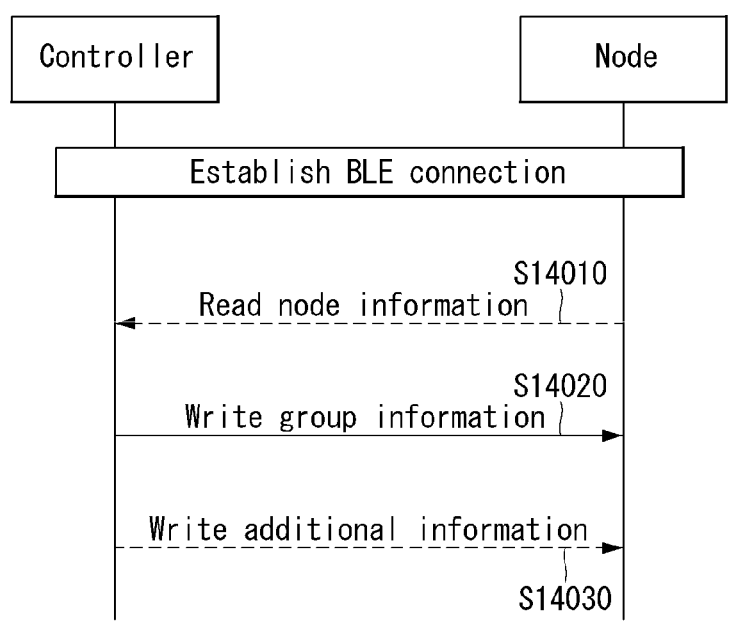

FIGS. 13 and 14 are diagrams showing examples of a method of configuring a device that will play a role as a master that generates and manages a group, which is proposed in the present invention.

Referring to FIGS. 13 and 14, the controller that controls a group for providing a PoB service may configure a device playing a role as a master that generates and manages a group.

Table 2 below shows an example of a group management protocol for generating and managing a group for providing a PoB service.

As shown in FIG. 13, the controller may select a specific device and configure the specific device so that it operates as a master for generating and managing a group.

The controller means a device (e.g., phone) capable of controlling all devices forming the group.

The controller selects a device that will plays a role as a master device based on capability information, such as the battery, processor power, etc. of each of plurality of devices forming a group.

Specifically, as shown in FIG. 14, the controller may form a Bluetooth connection with each of nodes, that is, devices that will form a group, and then may obtain node information of each node by reading the node information (S14010).

For example, the controller may transmit, to each node, a read request message to request the reading of node information, and may receive a read response message, including the node information, as a response thereto.

The node information may include information (e.g., capability information) indicating a function, performance, etc. supported by each node.

Step S14010 is an optional step and may not be performed.

Thereafter, the controller selects a node that will play a role as a master based on the obtained node information, and may write group information of a group to be generated in the selected node (S14020).

For example, the controller may transmit a write request message, including the group information, to the selected node. The selected node writes/stores data, included in the group information, in a corresponding characteristic.

The group information may include a role indicating a role in a group, a Group ID for identifying the group to be generated, and a Node ID for identifying nodes that will configure the group.

Thereafter, if the controller has additional data necessary to transmit data for providing a PoB service, it may write additional information (Info in Table 1) in the selected node.

TABLE 2

| Data/Charcteristic | Description | Size | Value | Condition | Operation |
|---|---|---|---|---|---|
| Role | Provide role (Master or Slave) in group | 1 byte | 0x00 - Master 0x01 - Slave | | Write by controller |
| Group ID | ID of group | 1 byte | Random configuration by controller | | Write by controller |
| Node ID | ID (use upon communication) upon operation | 1 byte | Random configuration by controller | | Write by controller |
| Master ID | Information of master node upon PoB operation | Same as Node ID | | When value of role is 1 | Write by controller |
| SlaveList | Information of slave nodes upon PoB operation | Plurality of Node IDs | | When value of role is 0 | Read by controller |
| Info | Additional data necessary when PoB data is delivered | | | | |
| Control Point | | 1 byte | 0x00 - Master operation start 0x01 - Slave operation start 0x02- Add Slave Info 0x03-Delete Slave Info 0x04 - Group Leave | | Write by controller or indication by device of group |

For example, the controller may transmit a write request message, including additional information, in the selected node. The selected node writes/stores each datum, included in the additional information, in a corresponding characteristic.

As described above, a node that will play a role as a master in a group may be determined through the controller. A selected node may generate a group for providing a PoB service by transmitting group information of the group to the determined node.

Figure 15:
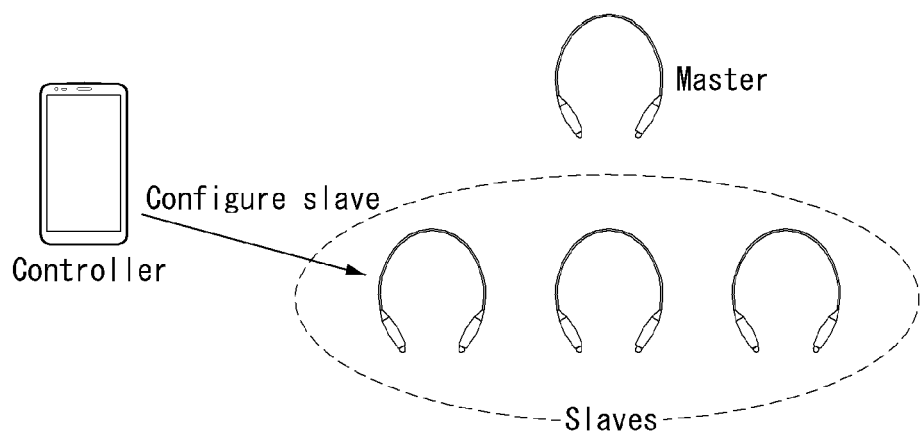
FIGS. 15 and 16 are diagrams showing examples of a method of adding a device to a group, which is proposed in the present invention.
Figure 16:
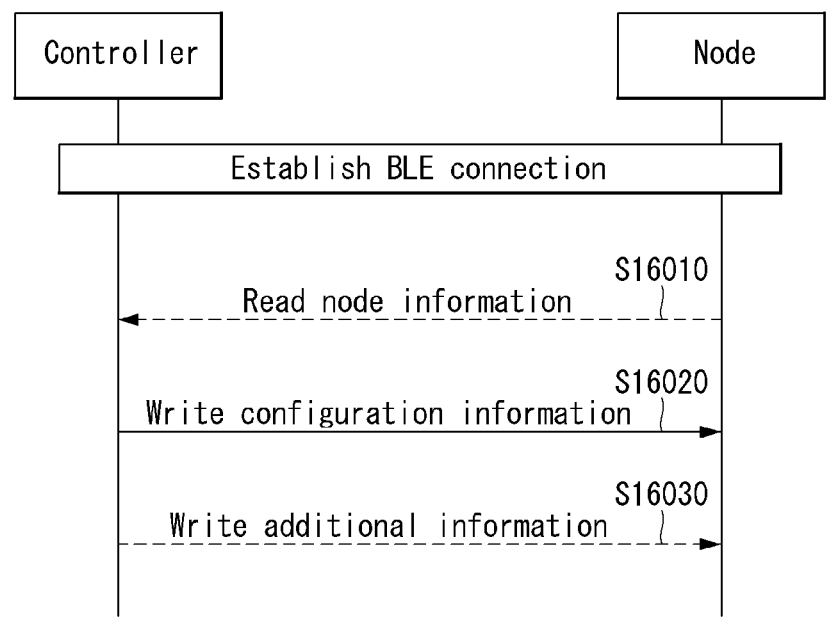

FIGS. 15 and 16 are diagrams showing examples of a method of adding a device to a group, which is proposed in the present invention.

Referring to FIGS. 15 and 16, the controller controlling a group for providing a PoB service may add a new device to a group by configuring a node that plays a role as a slave in the group.

As shown in FIG. 15, the controller may add a selected device as a node of a group by selecting a specific device and configuring the selected device so that it plays a role as a slave of the group.

Specifically, as shown in FIG. 16, the controller may establish a Bluetooth connection with a node, that is, a device to be added to a group, and then may obtain node information by reading it (S16010).

For example, the controller may transmit, to the node, a read request message to request the reading of node information, and may receive a read response message including the node information as a response thereto.

The node information may include information (e.g., capability information) indicating a function, performance, etc. supported by the node.

Step S16010 is an optional step and may not be performed.

Thereafter, the controller may write group information of a group in which the node will participate in the node (S16020).

For example, the controller may transmit a write request message, including the group information, to a node to be added. The node writes/stores each datum, included in the group information, in a corresponding characteristic.

The group information may include a role indicating a role in a group, a Group ID for identifying the group to be generated, a Node ID for identifying nodes that will configure the group, and a Master ID for identifying a node operating as a master in the group.

Thereafter, if the controller has additional data necessary to transmit data for providing a PoB service, it may write additional information (Info in Table 1) in the node.

For example, the controller may transmit a write request message, including additional information, to a selected node. The selected node writes/stores each datum, included in the additional information, in a corresponding characteristic.

Figure 17:
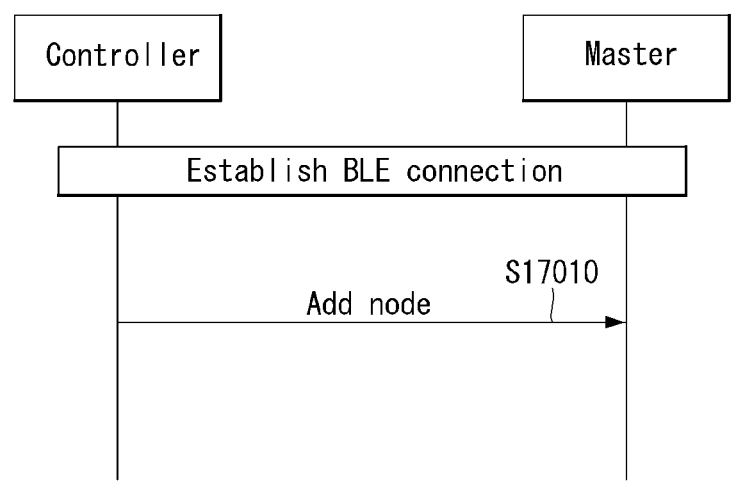
FIG. 17 is a diagram showing another example of a method of adding a device to a group, which is proposed in the present invention.

FIG. 17 is a diagram showing another example of a method of adding a device to a group, which is proposed in the present invention.

Referring to FIG. 17, unlike in FIG. 16, the controller may add a node to a group by transmitting node information of the node to be added to a master.

Specifically, the controller that has been connected to the master through Bluetooth transmits a write request message to request the writing of a control point characteristic indicating the addition of a node (S17010).

In this case, the write request message may include a value of "0x02", indicating the addition of node information in Table 1, and information of the node to be added.

The master that has received the write request message indicating the addition of the node from the controller writes a value for node addition in a control point characteristic, and adds node information of the node to be added to a "SlaveList" characteristic indicating nodes operating as slaves in the group.

Through such a method, the controller may add a node that will operate as a slave to a group that will provide a PoB service through a master.

Figure 18:
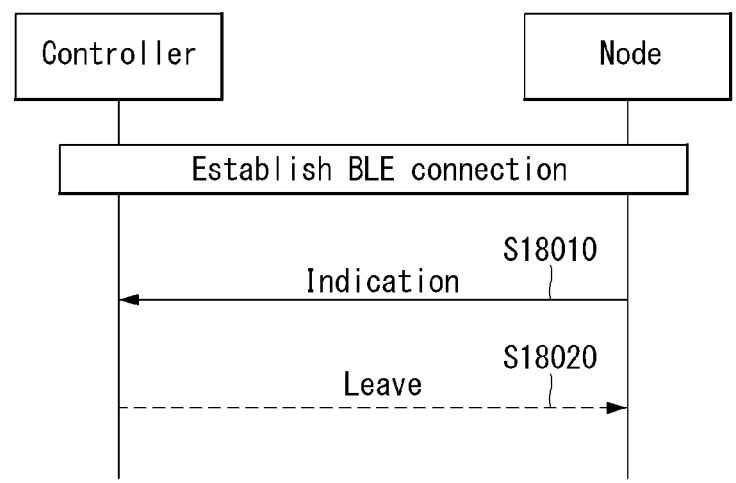
FIG. 18 is a flowchart showing an example of a method of leaving, by a device, from a group, which is proposed in the present invention.

FIG. 18 is a flowchart showing an example of a method of leaving, by a device, from a group, which is proposed in the present invention.

Referring to FIG. 18, if a node configuring a group wants to leave from the group, the node may be left from the group by transmitting, to the controller, a message to request withdrawal from the group.

Specifically, if a node forming a group wants to leave from the group, it transmits indication for withdrawal from the group to the controller connected the node through Bluetooth (S18010).

In this case, the indication may include node information of the node to be withdrawn.

The controller that has received the indication for withdrawal from the node may withdraw the node from the group, and transmits, to the node, a write request message to request the writing of a control point characteristic indicating the withdrawal of the node (S18020).

In this case, the write request message may include a value of "0x04", indicating the withdrawal of the node in Table 1, and group information of the group from which the node will be withdrawn.

When the node receives the write request message indicating withdrawal from the controller, it writes a value for withdraw in a control point characteristic and withdraws from the group.

Furthermore, the controller may notify a master of the withdrawal of the node by transmitting node information of the withdrawn node to the master, if necessary.

Figure 19:
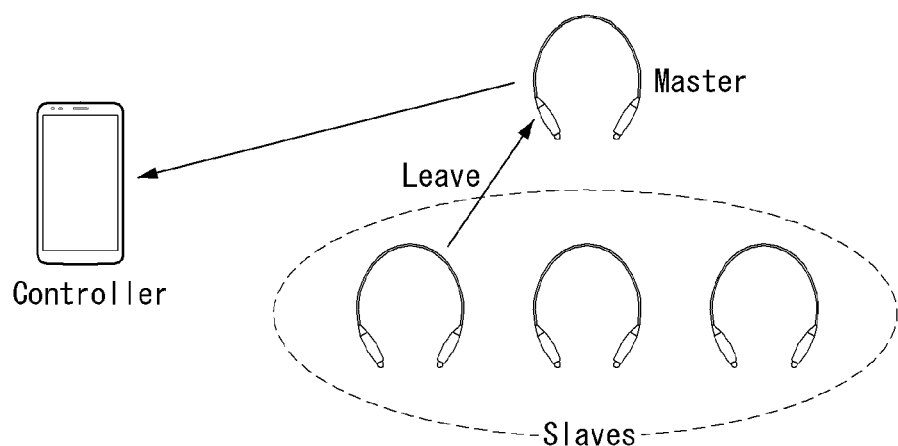
FIGS. 19 and 20 are diagrams showing other examples of a method for withdrawing, by a device, from a group, which is proposed in the present invention.
Figure 20:
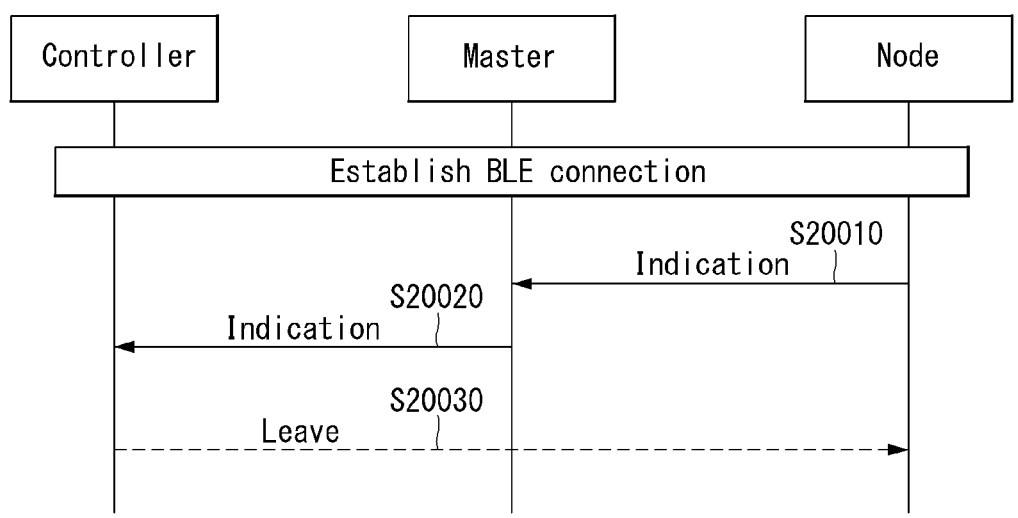

FIGS. 19 and 20 are diagrams showing other examples of a method for withdrawing, by a device, from a group, which is proposed in the present invention.

Referring to FIGS. 19 and 20, if a node configuring a group wants to leave from the group, it may leave from the group by transmitting a message to request withdrawal from the group to a master that manages the group.

As shown in FIG. 19, if a node operating as a slave in a group wants to leave from a group, the node may transmit, to a master, a message to request withdrawal from the group. The master may withdraw the node from the group by notifying the controller of the withdrawal of the node.

Specifically, as shown in FIG. 20, if a node forming a group wants to leave from the group, it transmits, to a master that manage the group, indication for withdrawal from the group (S20010).

The master that has received, from the node, the indication for withdrawal may notify the controller of the withdrawal of the node by transmitting the indication to the controller. The controller may withdraw the node from the group (S20020).

The indication may include node information of the node to be withdrawn.

Furthermore, if necessary, the controller transmits, to the node, a write request message to request the writing of a control point characteristic indicating the withdrawal of the node (S20030).

In this case, the write request message may include a value of "0x04", indicating the withdrawal of a node in Table 1, and group information of a group from which the node will be withdrawn.

When the node receives the write request message, indicating withdrawal, from the controller, it writes a value for withdrawal in a control point characteristic and leaves from the group.

In this case, the controller may not transmit information of the withdrawn node to the master because the master already recognizes the information of the withdrawn node.

Figure 21:
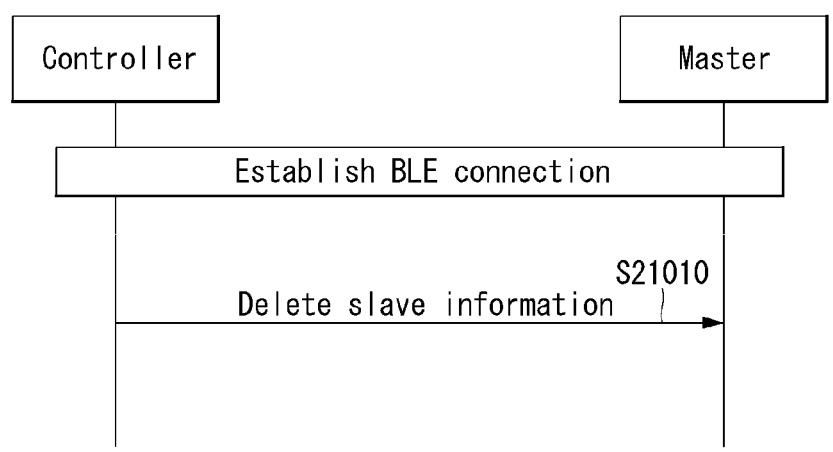
FIG. 21 is a flowchart showing an example of a method of deleting information of a device from a group, which is proposed in the present invention.

FIG. 21 is a flowchart showing an example of a method of deleting information of a device from a group, which is proposed in the present invention.

Referring to FIG. 21, the controller may delete node information of a withdrawn node by transmitting, to a master, information of a node playing a role as a slave that has left a group.

Specifically, the controller that has connected to a master through Bluetooth transmits a write request message to request the writing of a control point characteristic indicating node information deletion of a withdrawn node (S21010).

In this case, the write request message may include a value of "0x03", indicating the deletion of node information in Table 1, and node information of a node to be deleted.

The master that has received the write request message indicating the deletion of the node information from the controller writes a value for node information deletion in a control point characteristic, and deletes the node information of the withdrawn node in a "SlaveList" characteristic indicating nodes operating as slaves in a group.

Through such a method, the controller may delete node information of a slave that has left a group that will provide a PoB service through a master.

Figure 22:
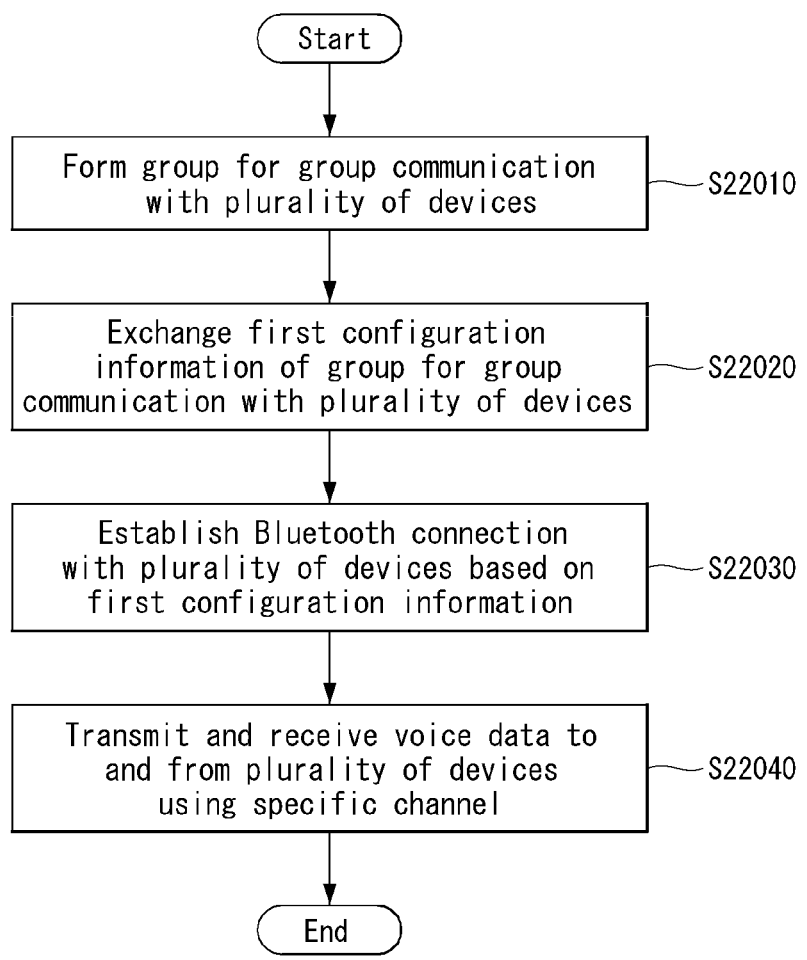
FIG. 22 is a flowchart showing an example of a method of forming a group using Bluetooth and transmitting and receiving data, which is proposed in the present invention.

FIG. 22 is a flowchart showing an example of a method of forming a group using Bluetooth and transmitting and receiving data, which is proposed in the present invention.

Referring to FIG. 22, a first device for providing a PoB service may transmit and receive voice data for providing the PoB service by forming a group along with a plurality of devices supporting Bluetooth.

Specifically, a first device attempting to transmit voice data for providing a PoB service forms a group for group communication with a plurality of devices (S22010). In this case, the group may be generated through the methods described in FIGS. 7 to 9.

Thereafter, the first device may exchange configuration information of the group for the group communication with the plurality of devices (S22020). The configuration information may include at least one of a Group ID for identifying a group generated to provide a PoB service, bonding information with each device, codec information for encoding and decoding voice data, an IRK (may be substituted with a Group ID) for using an encrypted address, or an encryption key for secure transmission.

Thereafter, the first device may establish a Bluetooth connection with the plurality of devices based on the configuration information (S22030). In this case, the first device may establish the Bluetooth connection using the time division scheme or broadcasting channel described in FIGS. 7 and 10. Furthermore, the first device may establish the Bluetooth connection with the plurality of devices based on Advertising or Scanning based on an executed role.

Thereafter, the first device may transmit and receive voice data for providing a PoB service to and from the plurality of devices using a specific channel for transmitting and receiving the voice data (S22040).

Furthermore, the drawings have been divided and described for convenience of the description, but a new embodiment may be designed so that it is implemented by merging the embodiments described with reference to the drawings. Furthermore, the range of right of the present invention also includes designing a computer-readable recording medium in which a program for executing the aforementioned embodiments has been written according to the needs of those skilled in the art.

The direction-based device search method according to this specification is not limited and applied to the configurations and methods of the aforemtioned embodiments, but some or all of the embodiments may be selectively combined and configured so that the embodiments are modified in various ways.

Meanwhile, the direction-based device search method of this specification may be implemented in a recording medium, readable by a processor included in a network device, in the form of code readable by a processor. The processor-readable recording medium includes all types of recording devices in which data readable by a processor is stored. The recording medium may include ROM, RAM, CD-ROM, magnetic tapes, floppy disks, and optical data storages, for example. Furthermore, the processor-readable recording medium may be distributed to computer systems connected over a network, and the processor-readable code may be stored and executed in a distributed manner.

Furthermore, although the preferred embodiments of this specification have been illustrated and described above, this specification is not limited to the aforementioned specific embodiments, and a person having ordinary skill in the art to which this specificaiton pertains may modify the present invention in various ways without departing from the gist of the claims. Such modified embodiments should not be individually interpreted from the technological spirit or prospect of this specification.

Furthermore, in this specification, both the apparauts invention and the method invention have been described, but the descriptions of both the inventions may be complementally applied, if necessary.

INDUSTRIAL APPLICABILITY

The data transmission and reception method of the present invention has been illustrated as being applied to Bluetooth LE, but may be applied to various wireless communication systems in addition to the Bluetooth LE system.

The invention claimed is:

1. A method of transmitting and receiving data by a first device using Bluetooth, the method comprising:
generating a group for group communication with a plurality of devices;
exchanging configuration information of the group for the group communication with the plurality of devices;
forming a Bluetooth connection with the plurality of devices based on the configuration information, wherein the Bluetooth connection is formed using a broadcasting channel or a time division scheme for simultaneously connecting to the plurality of devices; and
transmitting and receiving voice data to and from the plurality of devices using a specific channel, wherein when the first device plays a role as a client, the voice data is transmitted to the plurality of devices through a write request message, and
wherein the voice data is written in a specific characteristic of the plurality of devices.

2. The method of claim 1,
wherein the generating the group comprises:
forming a Bluetooth LE connection with a controller; and
receiving a first write message, including second configuration information for generating the group, from the controller,
wherein the second configuration information comprises at least one of role information indicating a role in the group, a group ID for identifying the group, or a node ID for identifying the first device in the group.

3. The method of claim 2,
wherein the generating the group further comprises receiving, from the controller, a second write message comprising additional information for the transmission and reception of the voice data.

4. The method of claim 1,
wherein the configuration information comprises at least one of a group ID for identifying the group or codec information indicating a codec for modulation and demodulation of the voice data.

5. The method of claim 1, further comprising:
exchanging, with each of the plurality of devices, identity resolving keys (IRKs) for use of an encrypted address and encryption keys for secure transmission of the voice data.

6. A method of transmitting and receiving data by a first device using Bluetooth, the method comprising:
generating a group for group communication with a plurality of devices;
exchanging configuration information of the group for the group communication with the plurality of devices;
forming a Bluetooth connection with the plurality of devices based on the configuration information, wherein the Bluetooth connection is formed using a broadcasting channel or a time division scheme for simultaneously connecting to the plurality of devices; and
transmitting and receiving voice data to and from the plurality of devices using a specific channel,
wherein the forming the Bluetooth connection comprises:
transmitting, to the plurality of devices, an advertising message using the broadcasting channel or the time division scheme, wherein the advertising message comprises a group ID for identifying the group; and
receiving, from each of the plurality of devices, a connection request message as a response to the advertising message,
wherein the connection request message comprises a connection interval parameter indicating an interval at which data is transmitted and received and a latency parameter indicating a number of deactivated connection events.

7. The method of claim 6,
wherein the connection interval parameter and the latency parameter are differently configured in each of the plurality of devices.

8. The method of claim 1,
wherein when the first device plays a role as a server, the voice data is transmitted to the plurality of devices through an indication message, and
wherein a specific characteristic for transmitting the voice data of the first device comprises a client descriptor configured to transmit the indication message when the voice data is generated.

9. A first device for transmitting and receiving data using Bluetooth, the first device comprising:
a communication unit configured to perform communication with an external device in a wireless or wired manner;
a memory configured to store data; and
a processor functionally connected to the communication unit,
wherein the processor is configured to:
generate a group for group communication with a plurality of devices;
exchange configuration information of the group for the group communication with the plurality of devices;
form a Bluetooth connection with the plurality of devices based on the configuration information, wherein the Bluetooth connection is formed using a broadcasting channel or a time division scheme for simultaneously connecting to the plurality of devices; and
transmit and receive voice data to and from the plurality of devices using a specific channel,
wherein when the first device plays a role as a client, the voice data is transmitted to the plurality of devices through a write request message, and
wherein the voice data is written in a specific characteristic of the plurality of devices.

10. The first device of claim 9,
wherein the processor is configured to:
form a Bluetooth LE connection with a controller, and
receive a first write message, including second configuration information for generating the group, from the controller,
wherein the second configuration information comprises at least one of role information indicating a role in the group, a group ID for identifying the group, or a node ID for identifying the first device in the group.

11. The first device of claim 10,
wherein the processor is configured to receive, from the controller, a second write message comprising additional information for the transmission and reception of the voice data.

12. The first device of claim 9,
wherein the configuration information comprises at least one of a group ID for identifying the group or codec information indicating a codec for modulation and demodulation of the voice data.

13. The first device of claim 9,
wherein the processor is configured to exchange, with each of the plurality of devices, IRKs for use of an encrypted address and encryption keys for secure transmission of the voice data.

14. A first device for transmitting and receiving data using Bluetooth, the first device comprising:
a communication unit configured to perform communication with an external device in a wireless or wired manner;
a memory configured to store data; and
a processor functionally connected to the communication unit,
wherein the processor is configured to:
generate a group for group communication with a plurality of devices;
exchange configuration information of the group for the group communication with the plurality of devices;

form a Bluetooth connection with the plurality of devices based on the configuration information, wherein the Bluetooth connection is formed using a broadcasting channel or a time division scheme for simultaneously connecting to the plurality of devices; and transmit and receive voice data to and from the plurality of devices using a specific channel, wherein the processor is configured to:

transmit, to the plurality of devices, an advertising message using the broadcasting channel or the time division scheme, wherein the advertising message comprises a group ID for identifying the group, and receive, from each of the plurality of devices, a connection request message as a response to the advertising message, wherein the connection request message comprises a connection interval parameter indicating an interval at which data is transmitted and received and a latency parameter indicating a number of deactivated connection events.

15. The first device of claim 14, wherein the connection interval parameter and the latency parameter are differently configured in each of the plurality of devices.

16. The first device of claim 9, wherein when the first device plays a role as a server, the voice data is transmitted to the plurality of devices through an indication message, and wherein a specific characteristic for transmitting the voice data of the first device comprises a client descriptor configured to transmit the indication message when the voice data is generated.

* * * * *